(12) United States Patent
Freund et al.

(10) Patent No.: US 8,219,403 B2
(45) Date of Patent: Jul. 10, 2012

(54) DEVICE AND METHOD FOR THE CREATION OF A VOICE BROWSER FUNCTIONALITY

(75) Inventors: Detlev Freund, Berlin (DE); Nobert Löbig, Darmstadt (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 351 days.

(21) Appl. No.: 12/160,976

(22) PCT Filed: Jan. 12, 2007

(86) PCT No.: PCT/EP2007/050291
§ 371 (c)(1),
(2), (4) Date: May 25, 2010

(87) PCT Pub. No.: WO2007/088095
PCT Pub. Date: Aug. 9, 2007

(65) Prior Publication Data
US 2010/0256979 A1   Oct. 7, 2010

(30) Foreign Application Priority Data
Jan. 31, 2006   (DE) .................... 10 2006 004 442

(51) Int. Cl.
*G10L 21/00*   (2006.01)

(52) U.S. Cl. ............... 704/270.1; 704/270; 704/275

(58) Field of Classification Search .............. None
See application file for complete search history.

(56) References Cited

U.S. PATENT DOCUMENTS

| | | | | |
|---|---|---|---|---|
| 6,269,336 B1* | 7/2001 | Ladd et al. | | 704/270 |
| 7,076,051 B2* | 7/2006 | Brown et al. | | 379/265.09 |
| 7,076,431 B2* | 7/2006 | Kurganov et al. | | 704/275 |
| 7,149,287 B1* | 12/2006 | Burger et al. | | 379/88.17 |
| 7,506,022 B2* | 3/2009 | Wang et al. | | 709/203 |
| 7,630,479 B2* | 12/2009 | Birch et al. | | 379/88.17 |

(Continued)

FOREIGN PATENT DOCUMENTS

DE   102006004442   8/2007

OTHER PUBLICATIONS

W3C, "Voice Browser Interoperation: Requirements (W3C Working Draft)", Internet Citation, (online) (Aug. 8, 2008) XP002273460.

(Continued)

*Primary Examiner* — Talivaldis Ivars Smits
*Assistant Examiner* — Jesse Pullias
(74) *Attorney, Agent, or Firm* — Laurence A. Greenberg; Werner H. Stemer; Ralph E. Locher

(57) ABSTRACT

In the case of an incoming call, at least attempting to select and allocate one of a plurality of different types of hardware platforms to the incoming call based on initial signaling information and load criteria and performing the allocation if the allocation can be provided. If such an allocation cannot be provided, at least attempting to provide the allocation based on other signaling information following the initial signaling information. If such an allocation cannot be provided based on the other signaling information, then a relevant voice page is requested from a storage device and a pre-analysis is performed, during which the requests included therein are determined and the browser function is at least attempted to be allocated based on the determination, and if still no allocation can be achieved, then a universally usable browser functionality is allocated.

14 Claims, 2 Drawing Sheets

U.S. PATENT DOCUMENTS

| | | | | |
|---|---|---|---|---|
| 7,940,911 | B2 * | 5/2011 | Berranger et al. | 379/220.01 |
| 2003/0091025 | A1 | 5/2003 | Celi, Jr. et al. | |
| 2003/0233239 | A1 * | 12/2003 | Creamer et al. | 704/270.1 |
| 2006/0168095 | A1 * | 7/2006 | Sharma et al. | 709/217 |

OTHER PUBLICATIONS

Danielsen, P.J., "The Promise of a Voice-Enabled Web", Computer, IEEE Service Center, Los Alamitos, CA. US BD. 33, No. 8, 1 Aug. 2000 pp. 104-106 XP000987575 ISSN 0018-9162.

* cited by examiner

DEVICE AND METHOD FOR THE CREATION OF A VOICE BROWSER FUNCTIONALITY

CLAIM FOR PRIORITY

This application is a national stage application of PCT/EP2007/050291, filed Jan. 12, 2007, which claims the benefit of priority to German Application No. 10 2006 004 442.8, filed Jan. 31, 2006, the contents of which hereby incorporated by reference.

TECHNICAL FIELD OF THE INVENTION

Device and method for the creation of a voice browser functionality.

BACKGROUND OF THE INVENTION

Recent communication architectures provide for the separation of call processing functions into call-service-related components and components relating to the transportation of the payload information (bearer control). This results in a separation of connection set-up and bearer set-up. Such a concept means for the communication traffic that there is no longer a strong link with the network topology.

In such modern communication architectures, announcement and dialogue services are provided which are functionally integrated in switching nodes or can be arranged as independent media servers in the network. In this arrangement, the media server provides a multiplicity of basic functions which act as a basis for the respective announcement and dialogue service. As examples, playing a recorded announcement possibly composed dynamically of a number of parts, voice synthesis according to a predetermined text in a desired voice, interactive dialogue support based on sound inputs (DTMF) via terminal, voice recognition, speaker recognition/verification or the recording and playing of voice and video messages etc. could be mentioned.

If the service provider is interested in maximum flexibility, short provision times and efficiency, he is supported in the definition of services by so-called service creation environment functions, the output of which is then the description of the desired call processing sequence via preferably standardized description languages such as, for example, CCXML or CSTAXML. The necessary descriptions of the announcement and dialogue components are preferably also provided in standardized form, e.g. via VoiceXML. In some business models, these descriptions can also be provided by customers of the network operator and can frequently change.

VoiceXML is an XML system for writing web pages for telephone applications. These are based on voice (hearing instructions and inputting commands by voice/DTMF). VoiceXML therefore supports the following features:
- spoken inputs (synthetic voice)
- outputs of audio files and streams
- recognition of spoken words and sentences
- recognition of dual-tone multifrequency dialing (DTMF)
- recording of spoken inputs
- controlling the dialogue flow
- telephony control (call transfer and hanging up)

Precursors of VoiceXML are Phone Markup Language (PML), VoxML, SpeechML, TalkML, VoiceHTML. SALT is an alternative to VoiceXML.

In general, a voice browser analyses the markup code composed in the form of a single file or a sequence of files, so-called voice pages, describing a voice dialogue, parses and interprets it and edits it for the telephone medium. For the actual input and output via the telephone, the browser must interact with the hardware and software of the media server platform for using the following resources:
- calling up the voice pages/files describing the dialogue from a storage medium
- calling up files referenced in the associated voice page, e.g. with voice to be output, recordings to be played, grammar information, other information characterizing and supporting the input and output or also possibly associated video information
- controlling the call and associated switching processes
- recognizing/recording DTMF or voice (ASR)-recognizing and verifying a speaker
- outputting audio files
- generating voice outputs in the desired voice from text (TTS)

An announcement is a special form of a voice dialogue in the above sense. The currently most frequently used standard for the description code of a voice browser is VoiceXML.

During the introduction of a service into the network, these descriptions are inserted in the switching nodes, application and/or media server. This can be done a priori or when required after activation of the service. In particular, this provides the VoiceXML description to the media server platforms. In principle, processing of the VoiceXML description on a media server platform requires a browser function or functionality which reads and interprets the VoiceXML pages so that the required basic functions of the media server can be allocated to the desired service and controlled.

At present, various efficient browsers are commercially available which greatly differ, e.g. with regard to a range of functions, licensing costs and requirements for the computer platform (CPU performance, memory, maximum number of parallel activations in dependence on HW and operating system). Thus, for example, a first browser may only be suitable for announcement operation or also DTMF dialogues but can be used without license costs, a second browser can be available and used as open source code but may have the disadvantage of requiring a lot of resources and/or not correspond to the newest standard and/or offer only a low service level to the network operator, or a third browser can cause high licensing costs, at the same time providing the full performance of the standard and economic utilization of resources.

In the prior art, media servers having only a single, possibly universal VoiceXML browser are used. The problems with such commercially available products lie in the high complexity which they provide even in the case of simple applications. In consequence, optimization can only be achieved by in-house development. Finally, there are no VoiceXML standard products offered on the market available with regard to optimal costs which meet the changing requirements of different application scenarios.

SUMMARY OF THE INVENTION

The invention is based on the object of demonstrating a path and specifying a device by means of which a VoiceXML browser functionality can be provided which is optimal for all services.

The advantage of the invention can be seen in the fact that a media server which simultaneously uses a multiplicity of different VoiceXML browser functions can be operated in such a manner that the applications to be used are fully supported with regard to the functionality desired in each case and, at the same time, optimality with regard to the resource of the media server used is achieved. This is provided by the suitable configuration of the media server (CPU, memory, licenses etc.) a priori and in active operation and by the suitable allocation of the HW platform (HMP/DSP) for the media stream processing per call/activation. The HW platform can thus be divided into two components, one component being arranged on the HMP or DSP platform and the remaining component being arranged in the media control.

Furthermore, the invention ensures optimality of costs in as much as license costs can be avoided or kept low. Providing a multiplicity of different VoiceXML browsers in a media server also additionally improves the aspect of costs.

A further advantage of the invention can be seen in the fact that the VoiceXML standard can be extended with regard to the declaration of resources, if necessary via a multiplicity of VoiceXML pages belonging together. In this arrangement, the type of the resource and the expected utilization of the resource is carried in the VoiceXML page as part of the resource declaration. In this context, the platform terminating the RTP (DSP or HMP) is allocated in dependence on the classification and on the basis of load aspects. Furthermore, it is possible to use the bearer redirect in the media server for further optimization of the resource requirement.

Finally, a further advantage with regard to resource optimization is given by the fact that the HMP and DSP resources are available in parallel in a media server with possibly different characteristics. The decomposition of browser entity and DSP/HMP functionality to different HW components of the media server also contributes to a better load distribution.

BRIEF DESCRIPTION OF THE DRAWINGS

In the text which follows, the invention will be explained in greater detail with reference to an exemplary embodiment represented in figure, in which.

DETAILED DESCRIPTION OF THE INVENTION

Figure 1:
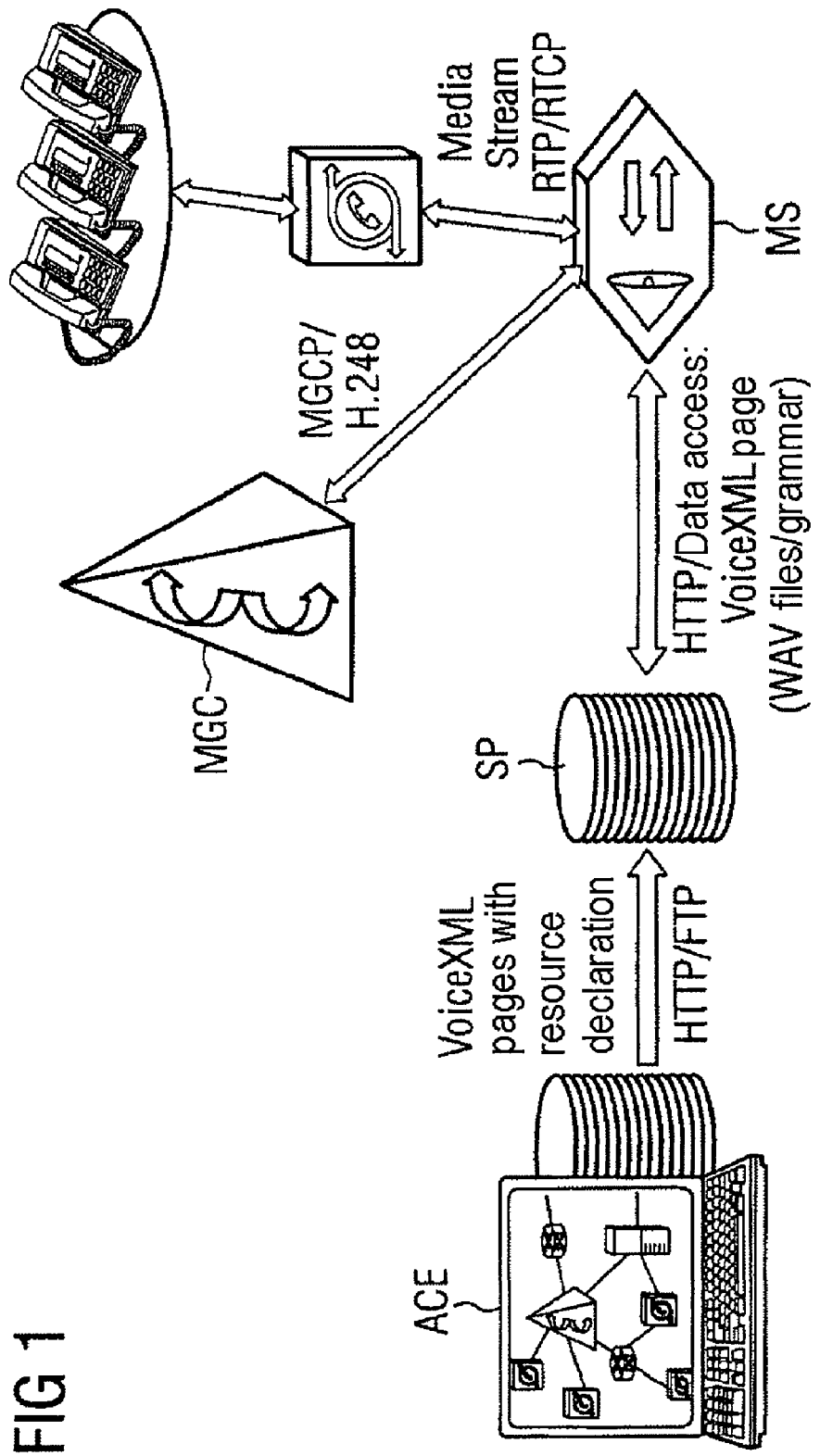
FIG. 1 shows an embodiment of a media server in the network.

FIG. 1 shows the interfaces of a media server MS with its environment. Accordingly, a server is shown on which an ACE (Announcement Creation Environment) program is running. This supports the designer in the design of new features and services. As a result of the design of announcement and dialogue components of a service, VoiceXML pages are created which are written into a storage device SP. The storage device SP can be part of the media server MS but, according to the present exemplary embodiment, should preferably be constructed as a central, stand-alone device (e.g. as a server) in the network. The pages created with the aid of the ACE program must first be brought into the storage device SP before they are available to the voice server for replaying. The VoiceXML pages are transferred to the storage device SP, for example, via HTTP or FTP protocol. All call processing processes, particularly the switching-through of a call to a media server are controlled and monitored by a media gateway controller MGC.

It is then provided to provide the VoiceXML pages with the declaration of resources. This information is then used during the service request provided for selecting one of the several browser functions.

Figure 2:
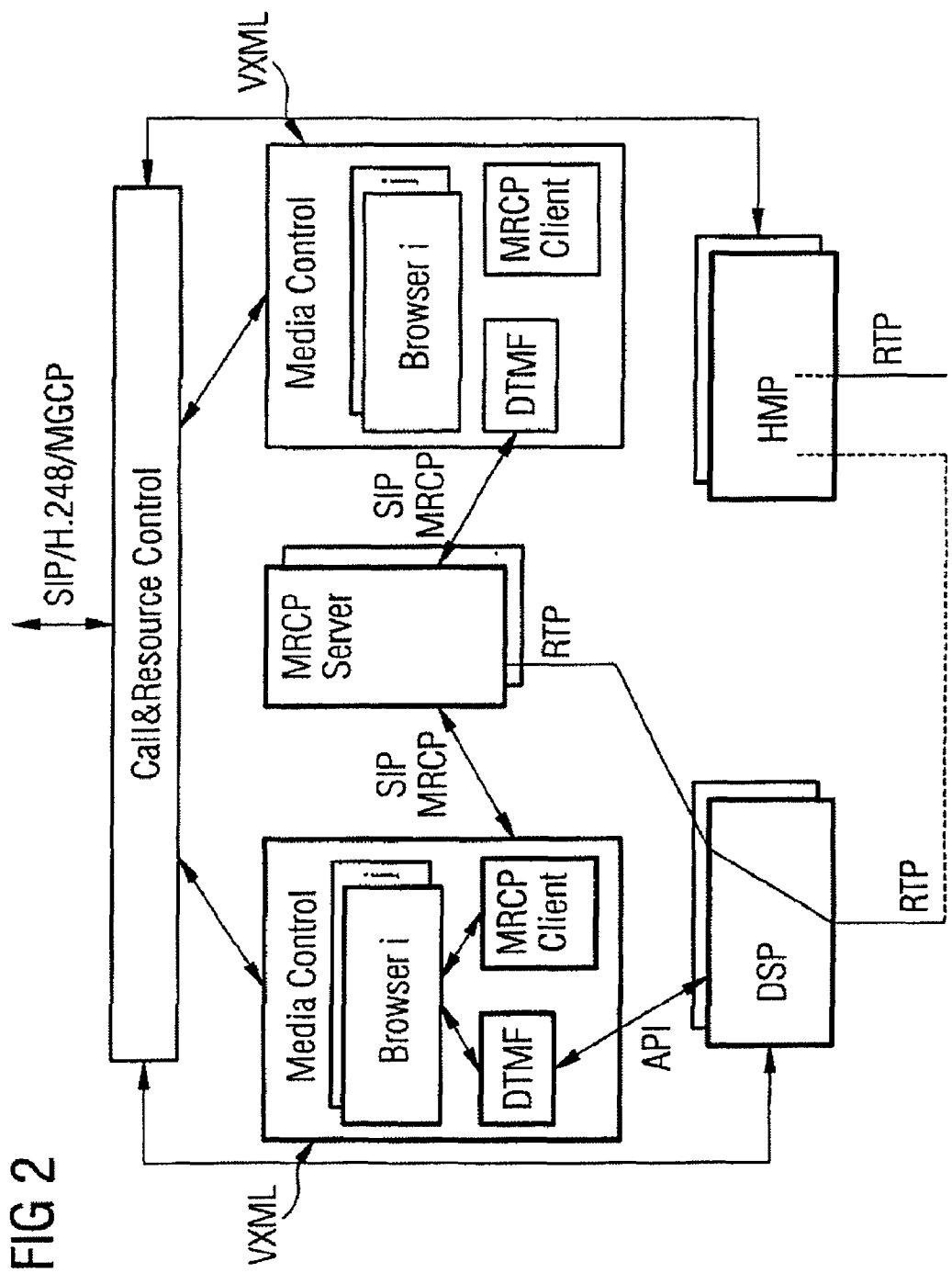
FIG. 2 shows the media server in accordance with the invention.

FIG. 2 shows the media server MS in detail. Accordingly, a Call&Resource control device is provided which has a direct interface to the signaling. It carries out the first evaluation of an incoming call. Furthermore, it allocates the bearer to a platform (DSP or HMP) as determined by the result of the evaluation and transfers the order to a media control device. This has the task of requesting the VoiceXML pages and of browsing, i.e. reading and interpreting the VoiceXML pages. For this purpose, at least one browser functionality is provided in the media control device. According to the invention, a number of browser functionalities are provided in the media server MS. At least one MRCP server is used for voice processing (for example voice recognition, speaker recognition/verification, voice synthesis etc.) and is instructed by an MRCP client of the media control device. FIG. 1 also shows the platforms DSP and HMP which terminate the user data stream to the remote subscriber.

The MRCP servers shown in FIG. 2 are a component of the media server MS, but can also be constructed as external servers. Depending on the VoiceXML page, MRCP servers of different partners, having possibly different characteristics, can be addressed by one or a multiplicity of media servers.

The multiplicity of different VoiceXML browsers can reflect different versions of the VoiceXML standard as well as customized proprietary extensions of the VoiceXML standard. Alternative browsers to the VoiceXML standard can also be contained such as, e.g. browsers for SALT.

Hardware and browsers are allocated taking into consideration the load. For each hardware unit (e.g. assembly), there is an indication of the instantaneous load which can be balanced against the load requirement to be expected which is produced by the browsing and the processing of the page. The rough maximum requirement of performance to be expected or to be reserved is a part of the resource declaration of the VoiceXML page. A sequence of VoiceXML pages belonging together can be declared on the start page with the cumulative maximum required performance or also the average performance requirement to be expected.

To determine the maximum or the average performance requirement for browsing a VoiceXML page, the media server MS can be placed into an operating mode in which a VoiceXML page is subjected to multiple parallel browsing including correlated activities on a reserved CPU assembly of the system. This function is preferably a part of the service creation environment and provides for the automatic, in each case maximum or typical performance requirement information provided in the resource declaration of the VoiceXML page. The VoiceXML page suitable for determining performance is in each case derived from the actual VoiceXML page. On the derived page for determining the maximum performance requirement, for example, all interrogations are avoided, inputs needed such as MRCP server inputs, HMP/DSP messages are contained and can thus be emulated by the reserved HW.

Statistics data comprise, in particular, sell out of resources and processor overload aspects. Evaluation of the statistics data leads to free-running error messages to the operator on the basis of which the configuration (e.g. HW, SW licenses) of the media server can be adapted.

If a call comes into the central Call&Resource control device of the media server MS by means of signaling (e.g. SIP, H.248 MGCP) an attempt is made during a first method step to allocate the suitable hardware platform (HMP (Host Media Processing) or DSP (Digital Signal Processing)) on the basis of the port number addressed, the required directory number, the service addressed and other components of the signaling. This is done by taking into consideration the available free resources at the time of call placement. If this makes it possible to unambiguously deduce a hardware platform with reduced/restricted function (e.g. HMP), this is allocated, otherwise a universally usable platform is preferably allocated (e.g. DSP) if such a platform is available according to the load indication.

The media stream is then set up between the requesting far endpoint and the allocated platform. During this signaling exchange and any exchange following, other signaling information characterizing the type of media service to be provided may arrive. This can typically contain other information which is used for identifying the VoiceXML description to be processed.

If the type of media service to be provided cannot be determined on the basis of the first method step, the entire signaling information is subjected for determining the type of VoiceXML description to be processed and, taking into consideration the instantaneous loading of the browser functions and the HW providing them, an optimum browser function is selected on an HW unit during a second method step. In the second method step, the name of the VoiceXML page, an index identifying it or a signaling parameter not yet present in the first method step can be evaluated, in particular.

If the second method step does not lead to the determination of the browser function to be allocated, either, the media control function of the selected HW receives from the central Call&Resource control device the data of the request, the connection data of the associated media stream and the information about the VoiceXML browser to be used temporarily. Using these data, the media control now requests the relevant VoiceXML page and progressively all referenced files from the storage device SP. Since the necessary assurance about the VoiceXML browser to be used could not be obtained from the first and second method steps and there is a possibility of optimizing the associated browser function, transfer of the VoiceXML page to the browser function is preceded by a pre-analysis, during which the page's included requests of the service (version, voice processing, output only, DTMF inputs only etc.) are evaluated, as a third method step.

The third method step thus only occurs when necessary. Via the VoiceXML standard now defined, extensions describing the type of resources needed are appropriate for enhancing the effectiveness.

If a sequence of VoiceXML pages is to be played for an endpoint as part of a service, it is appropriate already to provide the above resource declaration on the start page even if only a part of the resources is needed on this first page. This can be entered automatically by the used creation environment at the time of the service definition before storage in the storage medium SP. This prevents errors and the required resources can be determined more rapidly at the running time. If only a single VoiceXML page is to be played, the declaration of resources is also provided at the beginning of the page in order to avoid the dynamic determination of the resource requirement via additional advance interpretation of the page.

The adequate and optimal VoiceXML browser now finally determined is supplied with the VoiceXML page or the first VoiceXML page of a sequence of VoiceXML pages and activated. The necessary actions with regard to conducting the RTP and dealing with the information transmitted are reported to the media control function.

If only a sequence of recordings is to be played, this can be effected by outputting precoded information via the entity, terminating the RTP, of a general purpose CPU or by actively coding a permanently coded information item via a DSP function particularly suitable for coding. The alternatives in this case are determined by the position of the RTP-based user data stream according to the HW allocation already made.

If the dialogue is to be controlled by the remote user of the service by means of the input of digits, that is to say via call processing tones, DTMF must be additionally recognized. This is preferably done by the function allocated for the termination of the media stream (e.g. DSP) and is reported to the media control. This correspondingly applies in the case of the generation of tones effective in call processing, as an alternative to playing these tones in the announcement mode via suitable predefined files.

If voice processing is required, corresponding resources are included for TTS, ASR, speaker identification and/or verification. These are organized as servers which may be addressed by a multiplicity of media control entities as clients. State-of-the-art signaling between media control and speech processing resource is preferably standardized, e.g. SIP/MRCP v2. In this context, the media control is responsible for setting up the media stream between terminating HW platform for the RTP and processing speech processing resource.

To optimally utilize the generally very expensive ASR resources, pure DTMF dialogues are preferably not conducted via MRCP servers. The entity terminating the RTP has to perform DTMF Detect and report to media control. In principle, HMP, media control, MRCP server and central Call&Resource control can run on the same platform. With regard to the MRCP servers, it may be appropriate to be able to address a multiplicity of possibly remote MRCP servers. Similarly, the case of allocating an MRCP server, possibly running on the same HW platform, per media control may also occur.

If it should not be possible (or wanted) that all information for selecting the required resources (DSP, HMP) are available at the beginning, there is also the possibility of internally rerouting to other resources. If the endpoint is on the HMP since initially only the playing of an announcement was required, but then information is to be collected in a second order (e.g. in the following VoiceXML page), the endpoint to the subscriber can remain at the HMP port but routed internally by the higher-level resource control from there to another media control or to a DSP card where the suitable resources are then available.

This can be seen in FIG. 2. The user data stream of the call arrives here at the HMP platform. From there, the Call&Resource control/media control sets up forwarding (dashed) to a DSP card. The full functionality is then available there because this connection can be processed there just like an RTP-based user data stream arriving directly. Furthermore, the optimum browser to be used is also determined from the set of available alternatives according to the above description in this case.

The invention claimed is:

1. A method for providing a voice browser functionality thereby providing announcements/dialogues, comprising:

in the case of an incoming call, at least attempting to select and allocate one of a plurality of different types of hardware platforms to the incoming call based on initial signaling information and load criteria and performing the allocation if the allocation can be provided;

if an allocation of one of the plurality of different types of hardware platforms cannot be provided, at least attempting to provide the allocation based on other signaling information following the initial signaling information;

if an allocation of one of the plurality of different types of hardware platforms cannot be provided based on the other signaling information, then a relevant voice page is requested from a storage device and a pre-analysis is performed, during which the requests included therein are determined and the browser function is at least attempted to be allocated based on the determination, and if still no allocation can be achieved, then a universally usable browser functionality is allocated.

2. The method as claimed in claim 1, further comprising entering a performance requirement as part of a resource declaration of the voice page, which is caused by browsing the voice page and which is balanced against available performance of the one of the plurality of different types of hardware platforms during the allocation.

3. The method as claimed in claim 2, wherein during the pre-analysis, the requirements is determined from a version of the browser, from a voice processing, from an output or from a DTMF input.

4. The method as claimed in claim 1, wherein in the initial signaling information, a port number addressed, a required directory number, and a service addressed are utilized for selecting the one of the plurality of different types of hardware platforms.

5. The method as claimed in claim 1, wherein the load criteria are defined as instantaneous utilization of the browser functions and the one of the plurality of different types of hardware platforms to provide an optimum browser functionality.

6. The method as claimed in claim 1, wherein the platform is allocated for terminating a user data stream and for controlling the announcement/dialogue sequence.

7. The method as claimed in claim 1, wherein markup code of the voice browser is defined by VoiceXML.

8. The method as claimed in claim 1, further comprising:
providing a server with a plurality of different voice browsers; and
selecting each one of the plurality of different voice browsers from the group consisting of: voice browsers for different versions of a system for writing web pages for telephone applications, voice browsers for different extensions of a system for writing web pages for telephone applications, and voice browsers for different systems for writing web pages for telephone applications.

9. A device for providing a voice browser functionality thereby providing announcements/dialogues, comprising:
a number of browser functionalities; and
a processor executing at least one logic which attempts to provide a selection and an allocation of one of a plurality of different types of hardware platforms and a browser functionality, wherein
the allocation is initially attempted as determined by initial signaling information and load criteria,
if such an allocation cannot be achieved, the allocation is attempted to be achieved as determined by other signaling information following the initial signaling information,
if still no such allocation of one of the plurality of different types of hardware platforms can be achieved by using the other signaling information, then a relevant voice page is requested from a storage device and a pre-analysis is performed, during which a request included therein is determined and the browser function is allocated based on the determination, and if still no allocation can be achieved, then a universally usable browser functionality is allocated.

10. The device as claimed in claim 9, wherein the browser functionalities are arranged in a media server.

11. The device as claimed in claim 9, wherein one of the browser functionalities provided can be selected by resource requirement and the load criteria.

12. The device as claimed in claim 9, wherein the browser functionalities are defined by VoiceXML.

13. The device as claimed in 9, wherein during the pre-analysis, requirements are determined from a version of the browser, from voice processing, from an output or from a DTMF input.

14. The device as claimed in 9, further comprising:
a server with a plurality of different voice browsers;
wherein each one of the plurality of different voice browsers is selected from the group consisting of: voice browsers for different versions of a system for writing web pages for telephone applications, voice browsers for different extensions of a system for writing web pages for telephone applications, and voice browsers for different systems for writing web pages for telephone applications.

* * * * *